United States Patent Office 2,957,801
Patented Oct. 25, 1960

2,957,801
PEST CONTROL METHOD

Gail H. Birum, Dayton, Ohio, assignor to Monsanto Chemical Company, St. Louis, Mo., a corporation of Delaware No Drawing. Filed May 15, 1957, Ser. No. 659,206

3 Claims. (Cl. 167—33)

This invention relates to pest control and more particularly provides new toxicant compositions comprising the chlorination product of trithiane as the essential active ingredient, and methods of destroying or inhibiting the growth of bacteria and fungi in which methods said compositions are used.

Trithiane is a trimer of the sulfur analogue of formaldehyde, having the formula ($—CH_2S—$)$_3$, i.e.,

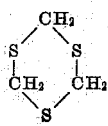

The literature reports the chlorination of trithiane with a variety of chlorinating agents, such as sulfuryl chloride, thionyl chloride, sulfur monochloride, sulfur dichloride, elemental chlorine, etc. Apparently under substantially anhydrous conditions, the chlorination proceeds with cleavage of the trithiane ring and simultaneous chlorination. The extent of chlorination depends, of course, on the quantity of chlorinating agent and other reaction conditions. The presently useful chlorination product of trithiane is a complex mixture containing from one to three moles of chlorine based on one mole of the trithiane used in the reaction. No complete investigation of the composition of this complex reaction mixture appears to have been published and the precise nature of this chlorination product remains undetermined at the present date.

In acordance with the present invention, a fraction of the complex reaction mixture which is the product of chlorination of trithiane by heating it with thionyl chloride under substantially anhydrous conditions to introduce from one to three moles of molecular chlorine per mole of trithiane is highly useful in biological toxicant methods. Moreover, as will be hereinafter shown, either the entire chlorination product or various distillable or undistillable fractions thereof possess general utility as biological toxicants.

As explained above, the composition of the reaction mixture obtained by chlorinating trithiane with thionyl chloride under the presently specified conditions—i.e., in a substantially anhydrous medium and to an extent so as to introduce from one to three moles of chlorine per mole of trithiane—is not fully understood at the present time. It is, therefore, not possible to define by structural formula the toxicant materials which serve as the effective ingredients in the biological toxicant process of this invention.

Trithiane chlorination products are those in which from one to three moles of chlorine have been introduced per mole of trithiane used; by moles of chlorine per mole of trithiane is here meant moles of molecular chlorine, i.e., of $Cl_2$, per mole of ($—CH_2S—$)$_3$. Thus, for example, from one to three moles of sulfuryl chloride may be reacted with one mole of trithiane, there being two atoms of chlorine present in each sulfuryl chloride molecule. Reaction of one mole of sulfuryl chloride with one mole of trithiane will then introduce two chlorine atoms per three —$CH_2S$— fragments while reaction of three moles of a chlorinating agent such as $SO_2Cl_2$ (sulfuryl chloride), $S_2Cl_2$ (sulfur monochloride) or $Cl_2$ (chlorine), etc. with one mole of trithiane would introduce six atoms of chlorine per three —$CH_2S$— fragments present in one trithiane atom. Probably the chlorination products include compounds varying from unchlorinated or only mono-chlorinated products to perchlorinated sulfur-containing compounds, with all graduations between these stages being present in different degrees.

According to the present invention I employ in the biological toxicant methods herein disclosed, that portion of the trithiane chlorination product which is non-distillable at below 128° C./20 mm. of mercury pressure.

I have found that compositions comprising an inert carrier and said trithiane chlorination product are of general utility as biological toxicants, particularly as fungicides, bacteriostats, insecticides, nematocides and general parasiticides. As fungicides they are highly efficient for preventing and retarding fungus growth on plants, textiles, fur, leather, wood, etc. The chlorination product may be applied directly to the material which is to be treated, but because it is effective against fungi in extremely dilute concentrations, e.g., in as little as one part of the trithiane chlorination product per million parts of the carrier, it is preferred to incorporate it with a carrier or diluent. When it is to be employed as a fungicide, the chlorination product is advantageously incorporated into an oil-in-water emulsion and the latter applied as a spray. The word "oil" as used here denotes any water-immiscible organic liquid. Emulsions of the chlorination product which possess fungicidal, bactericidal, and nematocidal properties are prepared by first dissolving said product in an organic material which is a solvent therefor, and then mixing the organic solution with water in the presence of an emulsifying agent. Emulsifying agents which may be employed are those customarily used in the art for the preparation of oil-in-water emulsions, e.g., ionic or non-ionic emulsifying or dispersing agents such as the alkali metal salts of long-chain alkylbenzenesulfonic acids, long-chain polyglycol ethers, or long-chain alkyl sulfosuccinates, say in a quantity of from 0.01 to 1.0 percent by weight of the total weight of the emulsion. As hereinbefore stated, the content of trithiane chlorination product is very small, varying from, say, 0.0001% to 1.0% of the total weight of the emulsion, depending upon the organism which is to be inhibited or eradicated. At the extremely low concentrations at which the trithiane chlorination product is effective against microorganisms, e.g., fungi, bacilli, and nematodes, substantially no phytotoxic effect is demonstrated.

While the trithiane chlorination product is most advantageously used as a biological toxicant when incorporated into oil-in-water emulsions, it may also be used in other pest-destroying methods. Thus it may be mixed with solid carriers such as clay, talc, pumice and bentonite, to give toxicant dusts which may be applied in effective quantities to undesired organisms. Although solutions of said chlorination product in organic solvents therefor may be employed as toxicant compositions, I have found that the oil-in-water emulsions of the product possess an improved tendency to adhere to the treated organism and to penetrate the sometimes difficulty permeable outer protective coverings of the pests, and that the emulsions require less of the trithiane chlorination product to give comparable inhibiting or toxic effect than do the organic solutions or dusts.

The invention is further illustrated, but not limited by the following example:

Example

A mixture consisting of 277 g. (2.0 moles) of trithiane and 476 g. (4.0 moles) of thionyl chloride was heated to a maximum temperature of 149° C. in a time of about 19 hours, and the resulting reaction mixture was distilled from a Claisen flask to obtain:

(I) 371.5 g. of material boiling up to 128° C./20 mm.
(II) 153.5 g. of residue.

The residue (II), analyzing 21.9% chlorine and 43.14% sulfur, was tested for fungistat activity using the following procedure:

Ten fold serial dilutions of said cut A ranging from 1:1,000 through 1:1,000,000 were prepared in agar, the agar was inoculated with the test organism and after a suitable incubation period, examined for presence or absence of growth. The following results were obtained:

| Fungistatic test organism: | Lowest p.p.m. inhibiting growth |
|---|---|
| Aspergillus niger | 10 |
| Penicillium expansum | 1 |
| Fomes annosus | 1 |
| Menoniella echinata | 1 |
| Hormiscium gelatinosum | 1 |
| Chaetomium globosum | 1 |
| Ceratostomella pilifera | 1 |
| Aspergillus oryzae | 1 |
| Cladosporium herbarum | 1 |
| Alternaria tenuis | 1 |
| Myrothecium verrucaria | 1 |
| Stemphylium sarcinaeforme | 1 |
| Monolinia fructicola | 1 |

Testing of said residue II against bacteria at a concentration of 10 parts of said residue per million parts of agar showed complete inhibition of the following:

*Cornyebacterium diphtheriae*
*Mycobacterium phlei*
*Erwinia atroseptica*
*Salmonella typhosa*

At 100 p.p.m. of said residue, the following organisms were found to be completely inhibited:

*Micrococcus pyogenes* var. *aureus*
*Streptococcus faecalis*
*Bacillus cereus* var. *mycoides*
*Bacillus subtilis*
*Escherichia coli*
*Aerobacter aerogenes*
*Proteus vulgaris*
*Pseudomonas aeruginosa*

The chlorinated trithiane distillation residue may be applied directly to the bacteria or fungi to be combatted, e.g., by spraying, or it may be applied to plants or other locale, in a manner so as to function either as a preventive or therapeutic agent, in advance of an anticipated infection. Dust, emulsion or solution formulations may be employed for such application; furthermore, adhesive and wetting agent additives may be employed in the compositions of the invention to assist in the distribution thereof on the surfaces to be protected from the pests. The concentrations of the present residue which is employed in bacteriostat or fungistat formulations will depend on the particular reaction product utilized and the species to be attacked; a typical formulation, for example, may contain from 0.001% to 0.1% of active ingredient, with the balance being a small quantity of a wetting agent and an inert carrier such as water, an inert organic liquid, or a dust such as talc or pumice. Effective concentrations for use under particular circumstances may be readily determined by those skilled in the art.

What I claim is:

1. A method for controlling bacteria and fungi which includes the step of applying to matter subject to infestation and attack by these organisms a toxic concentration of the residue obtained by chlorination of trithiane by heating with thionyl chloride under substantially anhydrous conditions to introduce from one to three moles of chlorine per mole of trithiane and removing from the resulting product material boiling below 128° C./20 mm. of Hg pressure.

2. A method for controlling bacteria which includes the step of applying to matter subject to attack by bacteria a toxic concentration of the residue obtained by chlorination of trithiane by heating with thionyl chloride under substantially anhydrous conditions to introduce from one to three moles of chlorine per mole of trithiane and removing from the resulting product material boiling below 128° C./20 mm. of Hg pressure.

3. A method for controlling fungi which includes the step of applying to matter subject to attack by fungi a toxic concentration of the residue obtained by chlorination of trithiane by heating with thionyl chloride under substantially anhydrous conditions to introduce from one to three moles of chlorine per mole of trithiane and removing from the resulting product material boiling below 128° C./20 mm. of Hg pressure.

References Cited in the file of this patent

UNITED STATES PATENTS

| 2,484,061 | Wood | Oct. 11, 1949 |
| 2,560,421 | Roselle | July 10, 1951 |
| 2,821,554 | Ospenson | Jan. 28, 1958 |

FOREIGN PATENTS

| 795,668 | France | Mar. 19, 1936 |

OTHER REFERENCES

Roark et al.: U.S. Dept. Agr., p. 16 (item 47), May 20, 1935, p. 47.

J. Econ. Ent., vol. 18, p. 126, 1925.

Truce et al.: J.A.C.S., vol. 74, pp. 3594–9, July–Sept. 1952.

Douglass et al.: J. of Organic Chem., vol. 15, 1950, pp. 795–9.